(12) United States Patent
Magnier-Cathenod et al.

(10) Patent No.: US 9,297,294 B2
(45) Date of Patent: Mar. 29, 2016

(54) CONTROL VALVE FOR A COOLING CIRCUIT OF AN AUTOMOBILE ENGINE

(75) Inventors: Anne-Sylvie Magnier-Cathenod, Saint-Cloud (FR); Jean-Sylvain Bernard, Les Mesnil Saint Denis (FR); Carlos Da Silva, Marcil-sur-Mauldre (FR)

(73) Assignee: VALEO SYSTEMES THERMIQUES, Le Mesnil Saint Denis (FR)

( * ) Notice: Subject to any disclaimer, the term of this patent is extended or adjusted under 35 U.S.C. 154(b) by 216 days.

(21) Appl. No.: 13/381,003

(22) PCT Filed: Jun. 30, 2010

(86) PCT No.: PCT/EP2010/059262
§ 371 (c)(1),
(2), (4) Date: Mar. 13, 2012

(87) PCT Pub. No.: WO2011/000859
PCT Pub. Date: Jan. 6, 2011

(65) Prior Publication Data
US 2012/0160192 A1 Jun. 28, 2012

(30) Foreign Application Priority Data
Jun. 30, 2009 (FR) ...................................... 09 03173

(51) Int. Cl.
*F16K 11/085* (2006.01)
*F01P 7/14* (2006.01)
*F16K 37/00* (2006.01)

(52) U.S. Cl.
CPC ............... *F01P 7/14* (2013.01); *F16K 11/0856* (2013.01); *F16K 37/0041* (2013.01)

(58) Field of Classification Search
CPC .................... F01L 2820/032; F01L 2013/103; F01P 7/14; F01P 2007/146; F01P 5/12; F16K 31/04; F16K 37/0041

USPC ............ 123/41.1, 41.08; 137/625.11, 625.46, 137/625.47, 1, 312; 210/133, 741; 251/309, 251/310, 129.11, 304
See application file for complete search history.

(56) References Cited

U.S. PATENT DOCUMENTS 3,315,756 A * 4/1967 Fly et al. ........................ 180/292
4,506,697 A * 3/1985 Marchant ....................... 137/312

(Continued)

FOREIGN PATENT DOCUMENTS

EP 1529937 A1 5/2005
FR 2850726 A1 8/2004

(Continued)

OTHER PUBLICATIONS

English language abstract for EP 1529937 extracted from the espacenet.com database on May 2, 2012, 14 pages.

(Continued)

*Primary Examiner* — Lindsay Low
*Assistant Examiner* — Long T Tran
(74) *Attorney, Agent, or Firm* — Howard & Howard Attorneys PLLC

(57) ABSTRACT

A control valve for a cooling circuit of an automobile engine comprises a valve body (12) provided with an input (20) and a number of outputs (22, 24, 26) for a coolant, an adjustment member (14) designed to rotate about a rotation axis (XX), an electric motor (30) coupled to the adjustment member (14) to bring it into chosen angular positions to control the distribution of the coolant between the outputs (22, 24, 26), and an absolute position sensor (50) coupled in rotation to the adjustment member (14) to deliver an output signal (S) representative of the angular position of the adjustment member (14), wherein the motor is able to be driven by a position controller (CP) which is designed to receive the output signal (S) and which is used to adjust the angular position of the adjustment member (14).

9 Claims, 2 Drawing Sheets

(56) References Cited

U.S. PATENT DOCUMENTS

| | | | |
|---|---|---|---|
| 4,673,160 A * | 6/1987 | Tolley | 251/129.05 |
| 4,836,250 A * | 6/1989 | Krambrock | 137/625.47 |
| 5,052,424 A * | 10/1991 | Zerndt et al. | 137/1 |
| 5,305,604 A * | 4/1994 | Phillips | 60/450 |
| 5,730,089 A * | 3/1998 | Morikawa et al. | 123/41.14 |
| 5,950,576 A | 9/1999 | Busato et al. | |
| 5,955,220 A * | 9/1999 | Takada et al. | 429/221 |
| 5,988,220 A * | 11/1999 | Sakaki | 137/625.47 |
| 6,024,060 A * | 2/2000 | Buehrle et al. | 123/90.12 |
| 6,345,645 B1 * | 2/2002 | Kenna et al. | 137/625.11 |
| 6,575,264 B2 * | 6/2003 | Spadafora | 180/422 |
| 6,679,202 B2 | 1/2004 | Nakano | |
| 6,769,445 B2 * | 8/2004 | Hashimoto et al. | 137/15.21 |
| 6,837,193 B2 * | 1/2005 | Kobayashi et al. | 123/41.1 |
| 6,920,845 B2 * | 7/2005 | Lelkes et al. | 123/41.01 |
| 7,255,130 B2 * | 8/2007 | Martins et al. | 137/625.46 |
| 7,343,882 B2 * | 3/2008 | Pipkorn et al. | 123/41.1 |
| 8,033,295 B2 * | 10/2011 | Meagher et al. | 137/625.11 |
| 2005/0034688 A1 * | 2/2005 | Lelkes et al. | 123/41.01 |
| 2006/0070672 A1 * | 4/2006 | Martins et al. | 137/625.47 |
| 2007/0262029 A1 * | 11/2007 | Yoshida et al. | 210/741 |
| 2009/0007978 A1 * | 1/2009 | Alston et al. | 137/872 |
| 2009/0078898 A1 * | 3/2009 | Sasaki et al. | 251/129.11 |
| 2010/0212612 A1 | 8/2010 | Vacca et al. | |

FOREIGN PATENT DOCUMENTS

| | | |
|---|---|---|
| FR | 2916479 A1 | 11/2008 |
| WO | WO 03/100950 A1 | 12/2003 |

OTHER PUBLICATIONS

English language abstract for FR 2850726 extracted from the espacenet.com database on May 2, 2012, 33 pages.
English language abstract not available for FR 2916479; however, see English language equivalent US 2010/0212612. Original document extracted from the espacenet.com database on May 2, 2012, 36 pages.
English language abstract for WO 03/100950 extracted from the espacenet.com database on May 2, 2012, 20 pages.
International Search Report for Application No. PCT/EP2010/059262 dated Sep. 16, 2010, 6 pages.

* cited by examiner

CONTROL VALVE FOR A COOLING CIRCUIT OF AN AUTOMOBILE ENGINE

RELATED APPLICATIONS

This application claims priority to and all the advantages of International Patent Application No. PCT/EP2010/059262, filed on Jun. 30, 2010, which claims priority to French Patent Application No. FR 09/03173, filed on Jun. 30, 2009.

The invention relates to the cooling circuits of automobile engines.

It relates more particularly to a control valve for a cooling circuit of an automobile engine, comprising a valve body provided with an input and a number of outputs for a coolant, an adjustment member designed to rotate about a rotation axis and a motor coupled to the adjustment member to bring it into chosen angular positions to control the distribution of the coolant between the outputs.

Control valves of this type are already known, notably from the publications FR 2850726 and FR 2916479 in the name of the applicant.

In the known embodiments, the control valve is generally a three-way valve having an input designed to be linked to the engine, a radiator output designed to be linked to a cooling radiator, a bypass output designed to be linked to a bypass circumventing the cooling radiator and a unit heater output designed to be linked to a unit heater used to heat the passenger compartment of the vehicle.

Such a control valve is usually driven by an actuator comprising an electric motor which controls the displacement of the adjustment member according to a chosen law.

In the known control valves, the adjustment member of the valve is returned to a mechanical abutment under the action of a return spring, which repositions the valve in a known position defined by this abutment.

This known solution makes it necessary to choose a gear motor capable of permanently overcoming the force of the spring and of using gears of large size to take the impacts on the abutment. This has the effect of overdimensioning the motor actuating the valve and the gears and of increasing the overall bulk of the valve.

Furthermore, the presence of the abutment is such that the adjustment member always has to rotate in the same direction of rotation to pass from one angular position to another, which may, in some cases, result in an angular travel of approximately 335°.

The aim of the invention is notably to overcome the above-mentioned drawbacks.

To this end, it proposes a control valve of the type defined in the introduction, which comprises an absolute position sensor coupled in rotation to the adjustment member to deliver an output signal representative of the angular position of the adjustment member, and the motor being able to be driven by a position controller which is designed to receive the output signal and which is used to adjust the angular position of the adjustment member.

The position of the adjustment member is thus defined by an absolute position sensor, that is to say, a sensor which obtains an invariable reference position, unlike a relative type sensor.

This position sensor delivers an output signal, representative of the angular position of the adjustment member, which is transmitted to the position controller.

In these conditions, the invention makes it possible to eliminate the mechanical abutment and the return spring which were used hitherto in the known control valves.

Because of the elimination of the abutment and of the spring, the gears can have a smaller size since they have to be dimensioned to pass on the output torque and not the engine torque.

Furthermore, the elimination of the mechanical abutment makes it possible to reduce the overall height of the valve by approximately the height of the abutment.

Another advantage of the invention results from the fact that the absence of the mechanical abutment makes it possible to have the adjustment member rotate both in the clockwise direction and in the counterclockwise direction to go and find a precise position without passing through a zone with risks or else to perform the travel in a minimal time.

Thus, the maximum angular travel to be covered between two positions is 180°, instead of approximately 335° in the case of a valve with mechanical abutment.

Because of this, the passage from one position to another can be much faster than in the case of the valves of the prior art.

In the invention, the absolute position sensor is advantageously mounted directly on a rotation shaft of the adjustment member.

Preferably, the electric motor includes an output shaft which is offset relative to the shaft of the adjustment member and is linked thereto by a reducing gear mechanism.

The electric motor is capable of rotating selectively in the clockwise direction or in the counterclockwise direction under the control of the position controller to minimize the angular displacement from one position to another.

The position controller is advantageously driven by heat management software included in a control circuit of the vehicle engine.

In a preferred embodiment of the invention, the valve body comprises an input arranged in the direction of the rotation axis and at least two outputs arranged radially relative to the rotation axis.

Under another aspect, the invention relates to a cooling circuit for an automobile engine, which comprises a control valve as defined previously.

In an advantageous embodiment, the control valve is a three-way valve, the input of which is linked to an intake of the coolant from the vehicle engine, and the three outputs of which are respectively linked to a first branch of the circuit which contains a cooling radiator, to a second branch of the circuit which constitutes a bypass of the cooling radiator and to a third branch of the circuit which contains a unit heater for heating a passenger compartment of an automobile.

In the following description, given solely as an example, reference is made to the appended drawings in which:

FIG. 1 is a plan view of a control valve according to the invention;

FIG. 2 schematically represents a control circuit of the valve;

Figure 1:
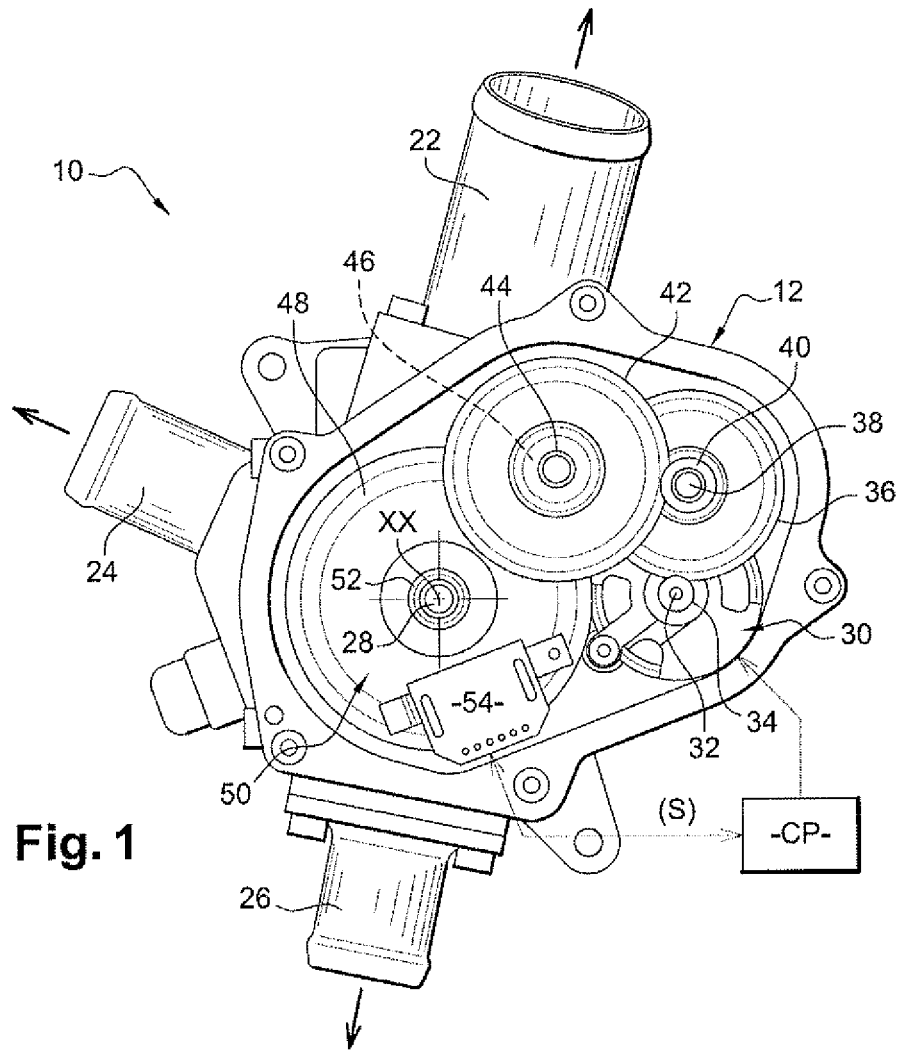
Figure 3:
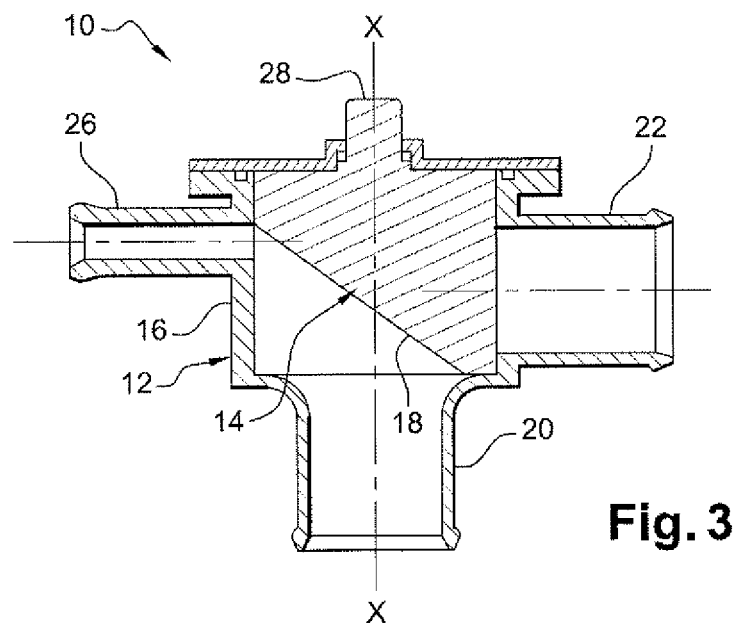
FIG. 3 is an axial cross-sectional view of the valve.

Reference is first of all made to FIGS. 1 and 3 which show a control valve 10 comprising a body 12 in which is mounted, in rotation, about a rotation axis XX, an adjustment member 14 (FIG. 3). In the example represented, the body 12 is delimited by a cylindrical wall and internally houses an adjustment member 16, here produced in the form of a solid cylindrical part having a truncated wall 18.

The body 12 of the valve is provided with a coolant input 20 arranged in the direction of the rotation axis (FIG. 3). Moreover, the valve body is provided with three outputs 22, 24 and 26 arranged radially relative to the valve body.

The output 22 is designed to be linked to a cooling radiator of an automobile engine, the output 24 is designed to be linked to a bypass of the cooling radiator and the output 26 is designed to be linked to a unit heater for heating the vehicle passenger compartment, as will be seen later in the description of the circuit of FIG. 4.

As can be seen in FIG. 1, the outputs 22 and 26 are substantially in alignment with one another, whereas the output 24 extends in a direction substantially perpendicular to the outputs 22 and 26.

The general structure of the valve 10, as has just been described, is already known, notably from the two publications cited in the introduction.

As can be seen in FIG. 1, the adjustment member 16 comprises a shaft 28 which extends from the body 12 of the valve. The adjustment member is driven in rotation by an electric motor 30, for example of the brush type, which comprises an output shaft 32 on which is keyed a pinion 34 which meshes with a toothed wheel 36 which is keyed on a shaft 38. On the shaft 28, another pinion 40 is keyed which meshes with a toothed wheel 42 attached to a shaft 44 on which is keyed a pinion 46 meshing with a toothed wheel 48 attached to the shaft 28 of the adjustment member. The set of pinions and toothed wheels mentioned above constitutes a reducing gear or gear reducer mechanism interposed between the output shaft 32 of the motor and the shaft 28 of the adjustment member.

An absolute position sensor 50 with a structure that is known per se is mounted directly on the shaft 28 of the adjustment member of the valve. This sensor 50 consists of a rotor 52 and a stator 54. The rotor 52 is mounted directly on the shaft 28, whereas the stator 54 is mounted on the valve body facing the rotor 52.

The absolute position sensor delivers an output signal S which is representative of the real angular position of the shaft 28 and therefore of the adjustment member relative to the valve body, therefore relative to the outputs 22, 24 and 26.

This output signal is sent to a position controller CP which drives the electric motor as schematically represented in FIG. 1.

Figure 2:
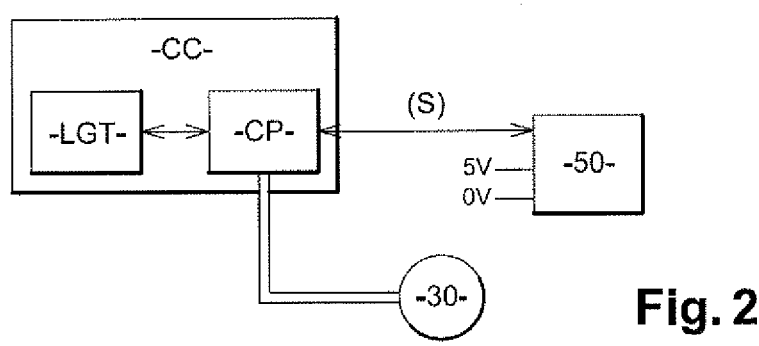

FIG. 2 illustrates in more detail the control circuit as a whole. The position controller CP is linked to the absolute position sensor. The latter comprises three wires, one wire linked to the earth, a control wire powered at +5 volts and a control signal wire which is applied to the position controller CP. The latter is in turn linked by two wires to the electric motor 30.

The position controller CP is driven by heat management software LGT included in a control circuit CC of the engine of the automobile.

This control circuit drives, in a conventional manner, all the parameters of the heat engine of the automobile.

The heat management software LGT is used to drive the position controller according to a chosen law, by means that are themselves known, which are not directly part of the invention and will therefore not be described here in detail.

Figure 4:
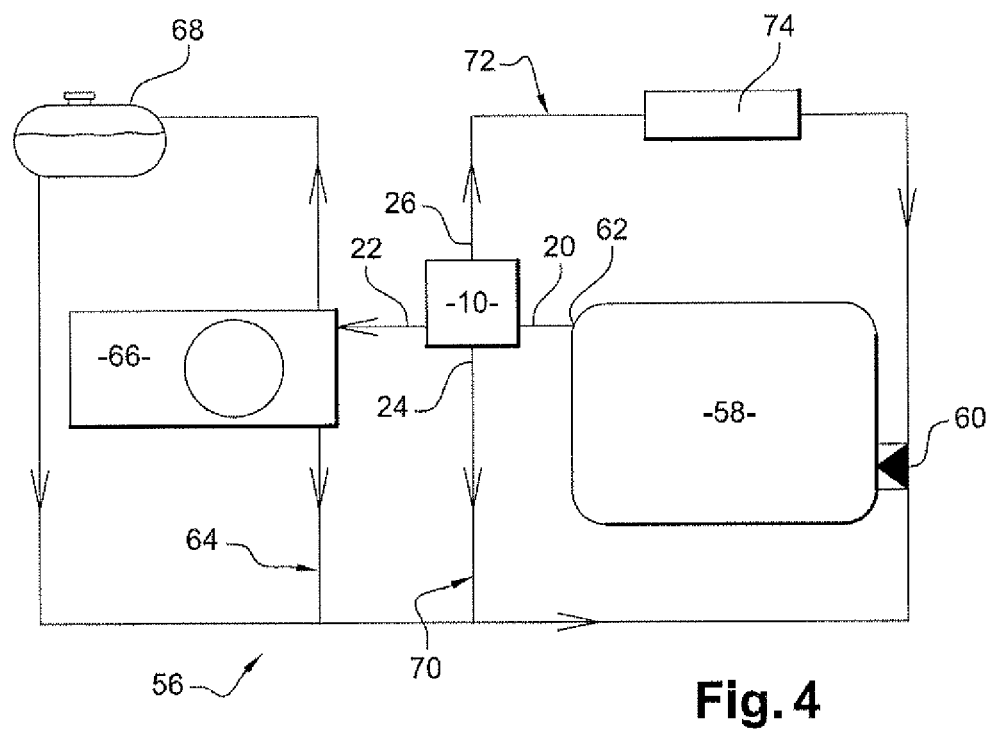
FIG. 4 represents a cooling circuit of an automobile engine, equipped with a control valve according to the invention.

FIG. 4, to which reference is now made, shows a circuit 56 for cooling a heat engine 58 of an automobile. This circuit 56 is passed through by a coolant, typically water with an antifreeze added, under the action of a pump 60. The coolant is heated by the engine, then leaves the latter through an output 62 which is linked to the input 20 of the control valve 10. The three outputs 22, 24 and 26 of the control valve linked respectively to three branches of the circuit 56.

The circuit 56 comprises a first branch 64 which contains a cooling radiator 66 and an expansion tank 68, a branch 70 which forms a bypass of the cooling radiator and a branch which contains a unit heater 74 used to heat the passenger compartment of the vehicle. The output 22 is linked to the branch 64 (radiator), the output 24 to the branch 70 (bypass) and the output 26 to the branch 72 (unit heater).

The valve makes it possible to independently manage the flow rates of the coolant in the aforementioned three branches in order to optimize the temperature of the heat engine and the heating of the passenger compartment. In particular, when starting the engine from cold, it makes it possible to circulate the coolant in the bypass branch without passing through the radiator. During this starting phase, it is also possible to have some or all of the coolant flow rate pass into the unit heater, if heating is desired.

When the temperature of the coolant has reached or exceeded a given threshold, the coolant passes through the radiator and circumvents the bypass. Furthermore, depending on whether or not heating is desired, a portion of the coolant may or may not pass through the unit heater.

These different laws are managed by the heat management software LGT described previously.

The invention thus makes it possible to manage the position of the adjustment member with a control valve of reduced bulk by virtue of the absolute position sensor, which makes it possible to dispense with the mechanical abutment and the return spring which were provided in the valves of the prior art.

The result thereof is a simplification of the control of the valve, all the more so since the absolute position sensor allows for the passage from one position to another and selectively with a clockwise or counterclockwise direction of rotation depending on the case, the maximum angular travel being 180°.

The invention is not limited to a valve of the type described and can be applied to other valves in which the structure of the input and of the outputs and that of the adjustment member are different.

The invention is applicable to the cooling circuits of automobile heat engines.

The invention claimed is:

1. A control valve for a cooling circuit of an automobile engine, said control valve comprising:
    a valve body (12) provided with an input (20) and a number of outputs (22, 24, 26) for a coolant;
    an adjustment member (14) having a rotatable shaft (28) configured to rotate in both a clockwise and counterclockwise direction about a rotation axis (XX);
    an electric motor (30) having a rotatable output shaft (32), a first pinion (34) on the output shaft (32), a rotatable first shaft (38), a toothed first wheel (36) on the first shaft (38) meshing with the first pinion (34), a second pinion (40) on the first shaft (38), a rotatable second shaft (44), a toothed second wheel (42) on the second shaft (44) meshing with the second pinion (40), a third pinion (46) on the second shaft (44), and a toothed third wheel (48) on the shaft (28) of the adjustment member (14) meshing with the third pinion (46) to reduce the output between the output shaft (32) of the electric motor (30) and the shaft (28) of the adjustment member (14) to bring the adjustment member (14) into chosen angular positions to control the distribution of the coolant between the outputs (22, 24, 26);
    an absolute position sensor (50) comprising a rotor (52) mounted directly on the shaft (28) of the adjustment member (14) and a stator (54) mounted on the valve body (12) facing the rotor (52), both being configured to deliver an output signal (S) representative of the angular position of the adjustment member (14); and a position controller (CP) configured to drive the electric motor (30) and to receive the output signal (S) and which is used to adjust the angular position of the adjustment member (14), and wherein the electric motor (30) is configured to rotate selectively in the clockwise direction or in the counterclockwise direction under the control of the position controller (CP) to minimize an angular displacement from one position to another.

2. The control valve as claimed in claim 1, wherein the output shaft (32) is offset relative to the shaft (28) of the adjustment member (14).

3. The control valve as claimed in claim 1, wherein the position controller (CP) is driven by heat management software (LGT) included in a control circuit (CC) of the vehicle engine.

4. The control valve as claimed in claim 1, wherein the valve body (12) comprises an input (20) arranged in the direction of the rotation axis (XX) and at least two outputs (22, 24, 26) arranged radially relative to the rotation axis (XX).

5. A cooling circuit for an automobile engine, wherein said cooling circuit comprises a control valve (10) as claimed in claim 1.

6. The cooling circuit as claimed in claim 5, wherein the control valve (10) is a three-way valve, the input (20) of which is linked to an intake of the coolant from the vehicle engine (58), and the three outputs (22, 24, 26) of which are respectively linked to a first branch (64) of the circuit which contains a cooling radiator (66), to a second branch (70) of the circuit which constitutes a bypass of the cooling radiator (66) and to a third branch (72) of the circuit which contains a unit heater (74) for heating a passenger compartment of an automobile.

7. The control valve as claimed in claim 6, wherein the position controller (CP) is driven by heat management software (LGT) included in a control circuit (CC) of the vehicle engine.

8. The control valve as claimed in claim 1, wherein the position controller (CP) is driven by heat management software (LGT) included in a control circuit (CC) of the vehicle engine.

9. The control valve as claimed in claim 1, wherein a lack of an abutment between the adjustment member (14) and the valve body (12) allows a maximum angular travel between two successive positions of the adjustment member (14) to be 180°.

* * * * *